United States Patent Office 3,548,304
Patented Dec. 15, 1970

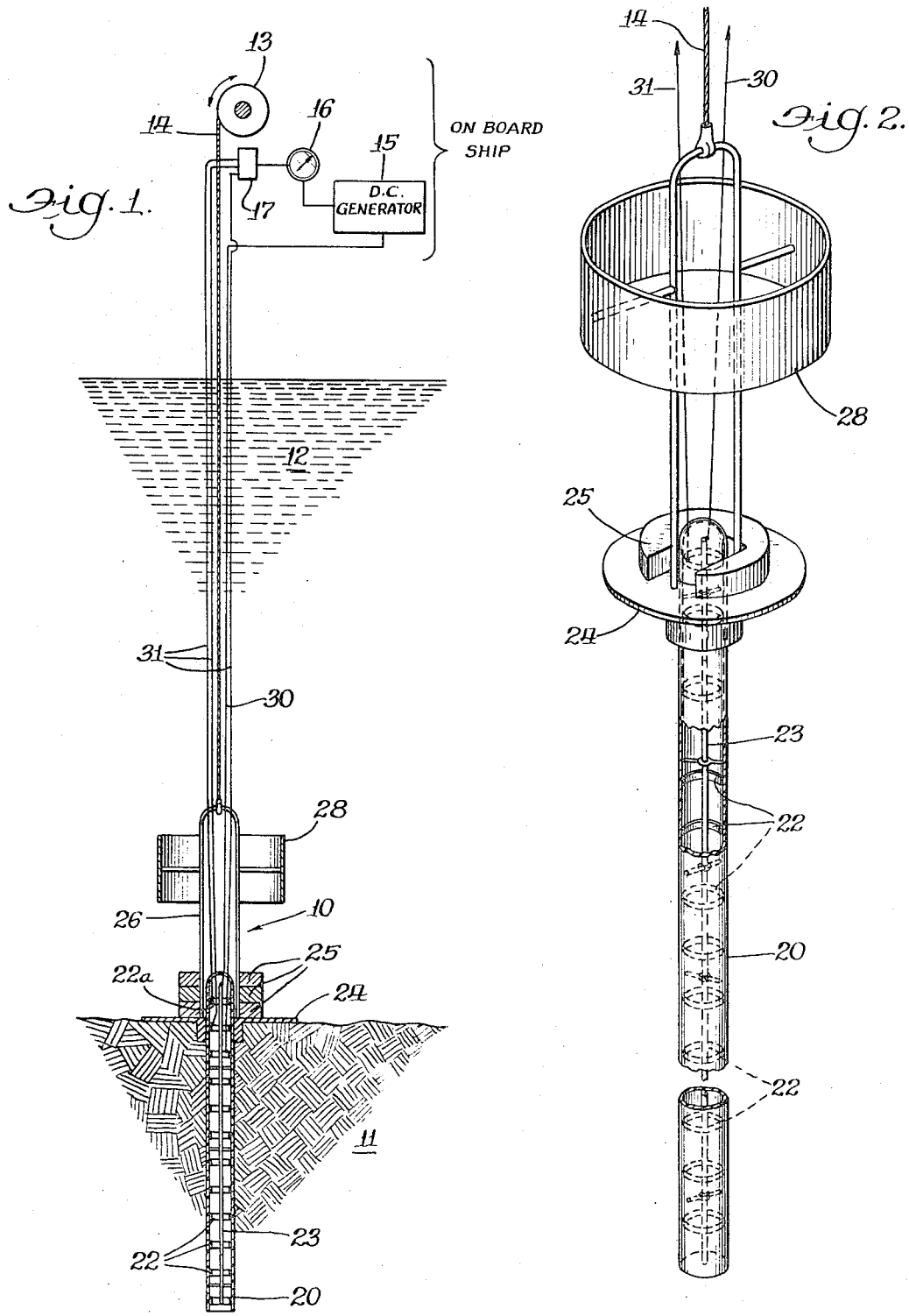

3,548,304
RESISTIVITY MEASURING DEVICE HAVING VERTICALLY-SPACED RING ELECTRODE AND A CENTRAL ELECTRODE
Robert A. Lohnes, Ames, Iowa, assignor to Iowa State University Research Foundation, Inc., Ames, Iowa, a corporation of Iowa
Filed Dec. 5, 1967, Ser. No. 688,258
Int. Cl. G01r 27/02
U.S. Cl. 324—65          5 Claims

ABSTRACT OF THE DISCLOSURE

Consolidation of subaqueous sediment is measured in situ by lowering a probe from a ship or other floating object; and the probe includes an elongated tube which penetrates the sediment under weight of the probe. A cylindrical shroud attached to the top of the probe acts as a stabilizer to keep the probe upright as it descends and penetrates the soil. The tube is a hollow cylinder, and it is provided with a plurality of torroidal electrodes spaced at constant longitudinal increments along its interior. Each of the electrodes is separately coupled through a selection switch to an ammeter on board the ship. A generator on board ship energizes an electrode extending axially of the tube through the ring electrodes. As the selection switch completes the circuit between the axial electrode and each of the ring electrodes, the ammeter measures the current flowing between the axial electrode and the ring electrode selected to complete the circuit. Thus, there is obtained a resistance or conductivity measurement for different depths of sediment. The resistivity measurements are indicative of consolidation of the sediment as a function of depth and they may be used to generate an equation for predicting future settlements of the soil under load.

BACKGROUND

The present invention relates to method and apparatus for measuring soil consolidation; more particularly, it relates to in situ measurement of consolidation of subaqueous sediment.

Heretofore, the principle methods for measuring subaqueous soil consolidation have consisted primarily of sampling techniques in which a thin-walled cylinder is forced into the sediment to recover a sample. The sample is then removed to a laboratory and tested by applying load to the soil placed in a consolidometer. Typically, the testing time is from one to two weeks.

In addition to the long time between sampling and receiving the test results, when a sample is removed from sediment at a substantial distance beneath the surface of the water, gases escaping from solution and expanding due to reduced pressure frequently render the sample incapable of being tested.

SUMMARY

The present invention contemplates lowering a probe through the water so that the probe penetrates the sediment beneath the water under its own weight. The probe is provided with vertically-spaced electrodes for measuring the incremental resistivity of the sediment as a function of depth. As will be made clear within, the resistivity measurement leads to a compression equation which may be used to predict further settlement under applied loads.

Thus, the present invention applies to an in situ method of determining consolidation of subaqueous sediment thereby eliminating the long delay times normally required and providing improved results by measuring consolidation under the actual pressure environment of the sediment.

Other features and advantages of the present invention, such as simplicity, etc., will be obvious to persons skilled in the art from the following detailed description of a preferred embodiment accompanied by the attached drawing.

DRAWING

FIG. 1 is a partially schematic diagram of apparatus for measuring incremental resistivity of sediment; and
FIG. 2 is a perspective view of the resistivity probe of FIG. 1.

THEORY

A careful analysis of the sea salt content in deep sea cores shows an inverse relationship between sodium chloride content and depth. It has been suggested that the relationship is possibly due to compaction of the sediment, resulting in a decrease in the interstitial water content with depth. The results of this study are reported in an article entitled "Sodium Chloride Content and Compaction in Deep-Sea Core" by P. J. Wangersky, in The Journal of Geology, May 1967. In this article, the author notes that correlation between NaCl content and depth usually can be improved by plotting the logarithm of the percent NaCl against depth. Classical consolidation theory of soils, however, suggests that the relationship should be percent NaCl vs. logarithm of depth, as is presently made clear.

"Consolidation" refers to the adjustment of saturated soils in response to increase load; and it involves the squeezing of water from the pores or interstices thereby resulting in a decrease in void ratio. The void ratio is defined as the ratio of the volume of voids to the volume of solids in a given sample.

A commonly-used consolidation equation developed by Dr. Karl Terzaghi is:

$$e_1 = e_0 - C_c \log \frac{P_1}{P_0} \quad (1)$$

where $e_0$ and $e_1$ are the void ratios at pressures $P_0$ and $P_1$, and $C_c$ is the compression index. The $e_0$ is often taken as the void ratio at unit pressure which simplifies Equation 1 to the following:

$$e_1 = e_0 - C_c \log P_1 \quad (2)$$

Since the content of NaCl is a function of the volume of interstitial water (as shown by Wangersky in the above-identified article), and the volume of interstitial water in a saturated soil is proportional to the void ratio, the NaCl content should be indicative of the void ratio. If depth is proportional to pressure, Equation 2 suggests that in the low pressure range the two variables should relate as percent NaCl vs. log depth.

The form of the regression equation for one of Wangersky's cores, relating percent NaCl to depth is given as follows:

$$100 \frac{S}{W_s} = 5.08 - 0.896 \log H \quad (3)$$

where $$100 \frac{S}{W_s}$$

is the percent NaCl and H is the depth in centimeters. As mentioned, the void ratio is by definition the ratio of the volume of void in a given volume of soil to the volume of solids in the same volume of soil. In a saturated soil, the volume of voids, $V_e = V_w$, where $V_w$ is the volume of interstitial water. Rewriting the void ratio equation in terms of weight yields:

$$e = \frac{V_w}{V_s} = \frac{W_w/\gamma_w}{W_s/\gamma_s} = \frac{W_w}{W_s}k \quad (4)$$

where $W$ and $\gamma$ signify weight and density of the respective components and $k$ is the ratio $\gamma_s/\gamma_w$. If the water contains dissolved solids in a concentration $a$, the weight of solids in the water is $S = aW_w$, and $$e = \frac{k}{a} \frac{S}{W_s} \quad (5)$$

where $W_s$ represents the dry weight of the soil exclusive of salt.

Pressure, $p$, at any sediment depth will depend on the buoyant weight, $W_b$, of the overlying solids. If the volume of solids in a column of height H and cross-sectional area A is $V_s$, the buoyant weight is:

$$W_b = pA = V_s(\gamma_s - \gamma_w) \quad (6)$$

The total sediment volume is $HA = \bar{e}V_e + V_s$. If an average void ratio $\bar{e}$ is used, $$HA = \bar{e}V_s + V_s \quad (7)$$

Solving for $V_s$ and substituting in Equation 5 gives $$p = H \frac{\gamma_s - \gamma_w}{1 + \bar{e}} \quad (8)$$

The least squares of NaCl vs. log depth now may be expressed in terms of $e$ and log $p$ by substituting from Equations 5 and 8.

For example, Equation 3 becomes $$e = \frac{k}{100a}\left[5.08 - 0.896 \log p \frac{(1 + \bar{e})}{\gamma_s - \gamma_w}\right] \quad (9)$$

Substituting values for $a$, $k$ and $\gamma$, and 2.4 for $\bar{e}$ gives $$e = \frac{2.60}{3.0}\left[5.08 - 0.896 \log p \left(\frac{3.4}{1.63}\right)\right]$$

$$e = 4.16 - 0.77 \log p \quad (10)$$

DISCUSSION

A void-ratio pressure relationship such as Equation 10 is useful to characterize compressibility of the sediment from the coefficient $C_c$ (the compression index) and to predict settlement of structures or objects on the sea bottom, according to well-known methods of soil mechanics. Ultimate consolidation of buried sediments can also be predicted, recognizing that the ultimate consolidation may not have occurred due to incomplete drainage of the pore water. Low sediment permeability or long drainage distance can retard or even prevent consolidation by inhibiting extrusion of the interstitial water. Thus, a linear correlation between void ratio and log pressure (or NaCl and log depth) is indicative of the compressibility and amount of total soil consolidation.

Excellent correlations between sediment pore water content and log depth have been obtained; in this case the void ratio-pressure relationship is obtained by use of Equations 4 and 8.

DETAILED DESCRIPTION

Soil deposits in situ are under a pressure gradient because of the weight of the soil, and therefore they are more consolidated at greater depth. The change in soil density with depth provides sufficient information to establish a compression relationship and thereby to predict further settlements under higher applied pressure. The present invention seeks to empirically establish this consolidation equation in situ testing. The electrical resistivity of saturated soils is a function of porosity and the concentration of dissolved salts in the pore water. In other words, for a saturated soil, the void ratio will decrease as a function of depth thereby indicating that the porosity also decreases. Since the concentration of the dissolved salt in the water remains constant, a compression equation may be written from the measurement of soil resistivity as a function of depth as long as the dissolved salt concentration remains constant.

Hence, the present invention contemplates measuring the resistivity of subaqueous sediment in order to establish a consolidation or compression equation for the soil.

Referring then to FIG. 1, a resistivity probe is generally designated 10, and it is embedded in sediment 11 located beneath a body of water which is generally designated 12. On ship board above the water 12, and shown schematically in the drawing, there is: a winch 13 for retracting a cable 14 which raises and lowers the probe 10; an electrical generator 15 for energizing electrodes within the probe 10 as will be described more fully below; a galvanometer or ammeter 16 for measuring current flow between electrodes which have been energized by the generator 15; and switching means 17 which electrically the galvanometer 16 in response to action by an operator couple a predetermined electrode within the probe 10 to on board ship.

Referring now to both FIGS. 1 and 2, the probe will be explained in greater detail. The probe 10 includes a thin-walled cylindrical pipe or plastic tube 20 which preferably is split longitudinally and hinged to allow access to its interior. The leading edge of the plastic tube 20 is open as at 21 so that the pipe penetrates the sediment without disturbing it. Thus, the undisturbed sediment fills the interior of the pipe much like prevailing thin-walled cylinder samples. A plurality of annular electrodes 22 are attached to the interior of the tube 20; and they are spaced vertically along the tube 20 at predetermined, constant increments. One electrode 22a (see FIG. 1) is above the sediment level to establish a reference value of resistivity. An electrode 23 extends from a location slightly above the sediment, axially of the plastic tube 20; and it passes through the center of the ring electrodes 22, and is supported along the axis of the tube by the insulating spacer bars shown.

At the top of the tube 20, there is attached an annular plate or shoulder 24 for supporting weights 25 which drive the tube 20 to penetrate the soil 11. The shoulder plate 24 acts as a limiting device for stopping further penetration of the probe and provides a reference for depth determination. A U-shaped handle member 26 is attached to the shoulder 24, and the winch cable 14 is attached to the top of the handle 26. The cylindrical shroud or vane 28 is connected to the handle 26, and acts as a stabilizer for maintaining the probe in an upright position through descent and pentration. A cable 30 connects the output of the DC generator 15 to the axial electrode 23.

Each of the electrodes 22 is connected by means of a separate wire to the on-board switching means 17. These interconnecting cables are illustrated in FIG. 1 as 31, and although only three are shown, it will be appreciated that there is a separate cable for each of the electrodes 22 on the interior of the tube 20. Thus, an operator on board ship may select by means of the switch 17 one of the ring electrodes to complete the circuit to the other terminal of the DC source 15. Current flows from the source 15, through the lead wire 30 and the axial electrode 23, through one of the ring electrodes 22, through the switch 17 and ammeter 16 back to the generator.

Resistivity of the undisturbed sediment is then determined from the current and voltage readings (at meter 16 and source 15 respectively) allowing for IR drops in the cables. From the incremental resistivity information as a function of the depth of penetration, a suitable compression equation can be generated as described above by relating the amount of NaCl present to the resistivity readings since the percent NaCl is determined by the interstitial water volume for constant salt concentration. The resistivity readings are therefore an indirect measure of pore volume.

In one specific probe model, the tube 20 has a diameter of 10 centimeters, and it is 10 meters long. The electrodes 22 are placed along the interior of the pipe at 10 centimeter increments.

In operation, the resistance probe is similar to a bottom core sampler device in that it is thrown overboard on a line and allowed to penetrate the bottom sediments under its own weight. As the device falls through the water, the shroud 28 keeps the probe 10 vertically oriented so that as it enters the sediment, the depth of each pair of electrodes can be accurately located due to the limiting plate 24. Once in place the resistivity is read for each pair of electrodes and a depth vs. resistivity characteristic plot defines the depth vs. porosity curve. This data is then converted to a compression curve for the sediment. The electrode above the weight shoulder does not penetrate the sediment in order to obtain a reference reading for the water.

It will be appreciated that the shape and form of the electrodes is not important except that they not disturb the soil as the probe penetrates and that they be vertically spaced apart. It is contemplated that the current could flow external to the tube if the electrodes are placed on the exterior. Further, the axial electrode could be eliminated. For example, a continuous metal strip longitudinally of the tube with individual facing plate electrodes attached diametrically across the tube with the individual electrodes being commutated by the on-board switch would achieve similar results. In addition, although in the illustrated embodiment, the resistivity measurements were primarily of horizontal elemental layers of sediment, resistivity between adjacent vertically-displaced electrodes could also be measured.

Having described a preferred embodiment of my invention, it will be obvious to persons skilled in the art that structural modifications other than those described may be made while continuing to practice the invention; and it is, therefore, intended that all such modifications and equivalents be covered as they are embraced within the spirit and scope of the invention.

I claim:

1. A system for use in determining the consolidation of subaqueous sediment comprising: a hollow, elongated tube of insulating material adapted to be inserted vertically into the sediment to contain a column of sediment under test, a plurality of first electrodes attached to the interior of said tube in vertical spaced relation whereby when said tube is embedded in sediment said electrodes engage the sediment contained in said tube in vertically spaced-apart relation, an electrically conducting rod electrode extending within and longitudinally of said tube while engaging the sediment contained therein and spaced from each of said first electrodes at a generally uniform distance, signal means for selectively energizing individual ones of said first electrodes relative to said rod electrode with electrical energy, and measuring means for measuring current flow between a selected one of said first electrodes and said rod electrode to thereby generate a resistivity measurement for different horizontal elemental areas of said sediment column, each of said areas being at a different depth within said column and confined by said tube.

2. The system of claim 1 further comprising reference electrode means secured to the interior of said tube and lying above sediment when said probe is inserted, said rod extending adjacent said reference electrode to provide a reference resistivity measurement.

3. The system of claim 1 wherein said first electrodes are rings attached to the interior of said tube at predetermined intervals longitudinally thereof and wherein said rod electrode extends axially through said tube and said ring electrodes.

4. The system of claim 1 further comprising weight means mounted on said probe means for forcing said tube into said sediment, and limiting means connected to said tube for limiting the penetration thereof to a predetermined depth.

5. The system of claim 4 further comprising a cylindrical shroud connected to the top of said probe for stabilizing the same in vertical orientation during its descent through water.

References Cited

UNITED STATES PATENTS

| | | | |
|---|---|---|---|
| 2,083,074 | 6/1937 | Maass | 324—30 |
| 2,379,106 | 6/1945 | Sanders | 73—304X |
| 2,461,111 | 2/1949 | Flinspach et al. | 324—65 |
| 2,782,364 | 2/1957 | Shuler et al. | 324—1 |
| 2,922,103 | 1/1960 | Smith | 324—10X |
| 3,327,968 | 6/1967 | Converse | 324—4X |
| 3,370,466 | 2/1968 | Chang | 73—304 |
| 3,051,893 | 8/1968 | Lynn | 324—30 |

FOREIGN PATENTS

| | | | |
|---|---|---|---|
| 959,046 | 5/1964 | Great Britain | 73—304 |

EDWARD E. KUBASIEWICZ, Primary Examiner

U.S. Cl. X.R.

324—10